S. W. CRAMER.
AIR CONDITIONING APPARATUS.
APPLICATION FILED JAN. 11, 1910.

1,073,096.

Patented Sept. 16, 1913.
2 SHEETS—SHEET 1.

Witnesses
J. L. Ourand
W. Porter Reinohl

Inventor
Stuart W. Cramer.
By D. C. Reinohl
Attorney

S. W. CRAMER.
AIR CONDITIONING APPARATUS.
APPLICATION FILED JAN. 11, 1910.
1,073,096.
Patented Sept. 16, 1913.
2 SHEETS—SHEET 2.
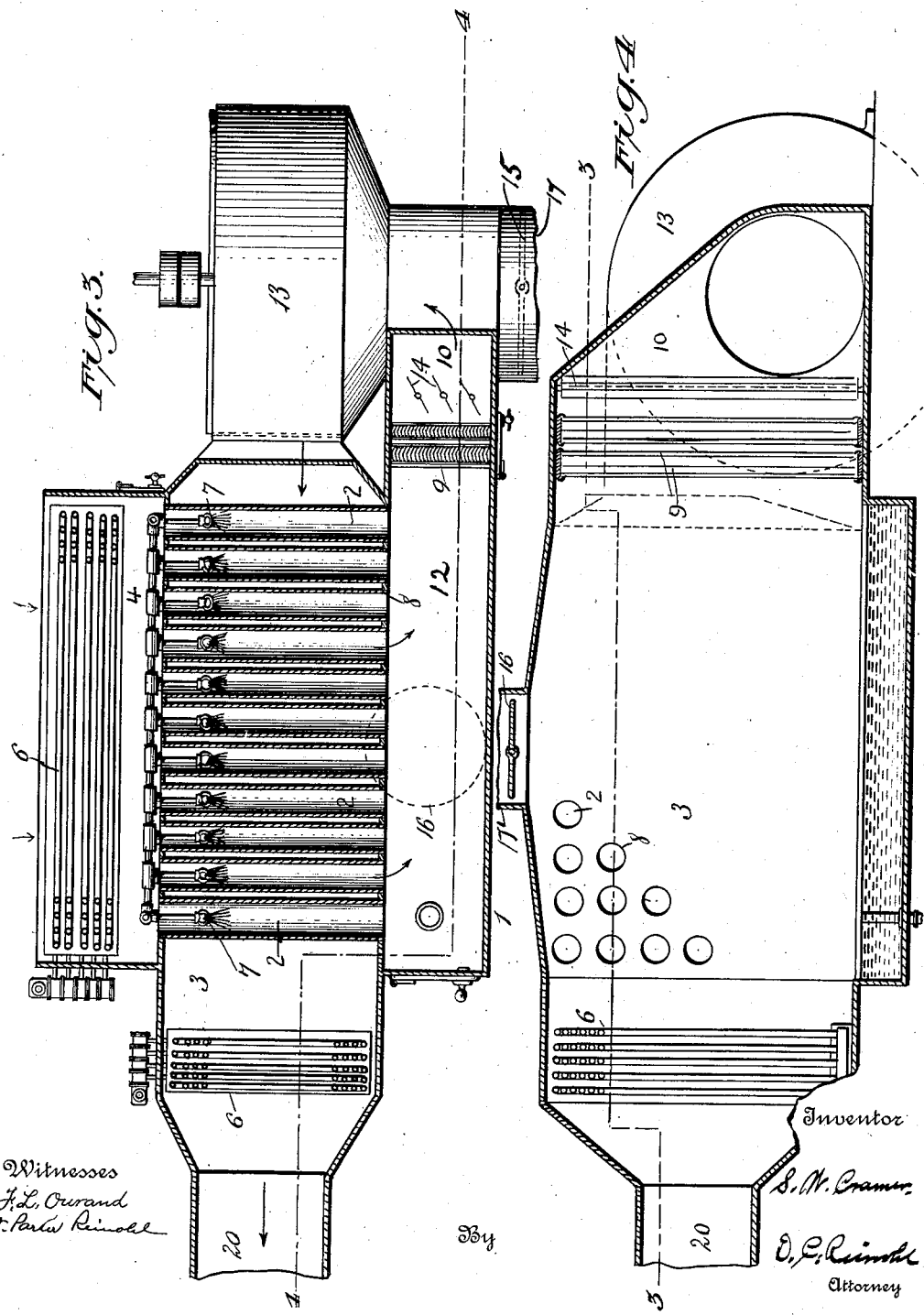

UNITED STATES PATENT OFFICE.

STUART W. CRAMER, OF CHARLOTTE, NORTH CAROLINA.

AIR-CONDITIONING APPARATUS.

1,073,096. Specification of Letters Patent. Patented Sept. 16, 1913.

Original application filed April 15, 1909, Serial No. 490,079. Divided and this application filed January 11, 1910. Serial No. 537,567.

*To all whom it may concern:*

Be it known that I, STUART W. CRAMER, a citizen of the United States, residing at Charlotte, in the county of Mecklenburg and State of North Carolina, have invented certain new and useful Improvements in Air-Conditioning Apparatus; and I do hereby declare the following to be a full, clear, and exact description of the invention, such as will enable others skilled in the art to which it appertains to make and use the same.

This invention relates to apparatus for treating air, whereby the air is cleansed of its impurities, and is conditioned by the addition or subtraction of moisture and heat as may be desired.

The object of this invention is to provide an apparatus whereby air cleansing, moistening, heating and cooling are attained as heretofore in similar types of apparatus, with the further advantage that cooling may also be continued even though moistening be discontinued, and without the aid of refrigeration, the circulation of cold water, or other liquids, or the like.

The invention consists in certain improvements which will be fully disclosed in the following specification and claims.

This application is a division of my application for a patent filed April 15th, 1909, Serial Number 490,079.

Figure 1:
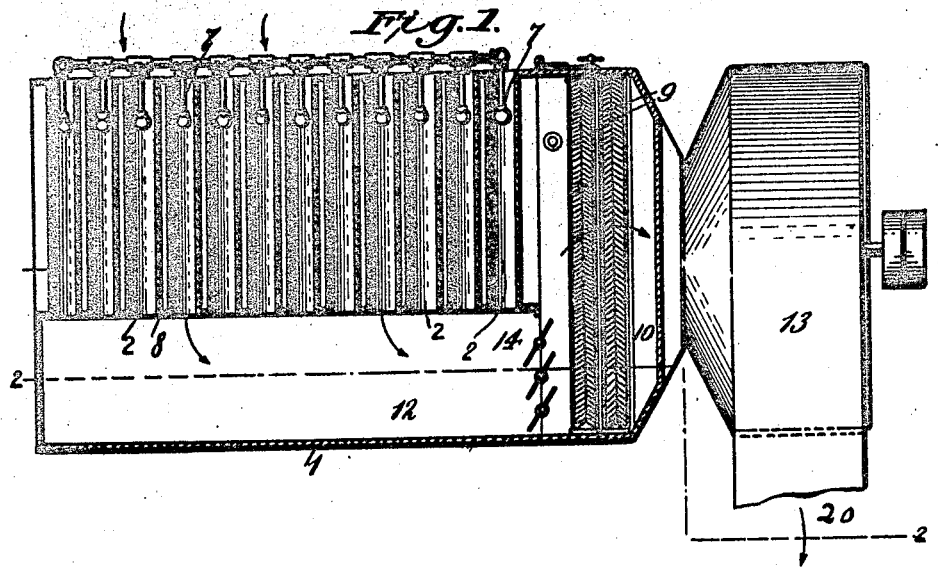
Figure 2:
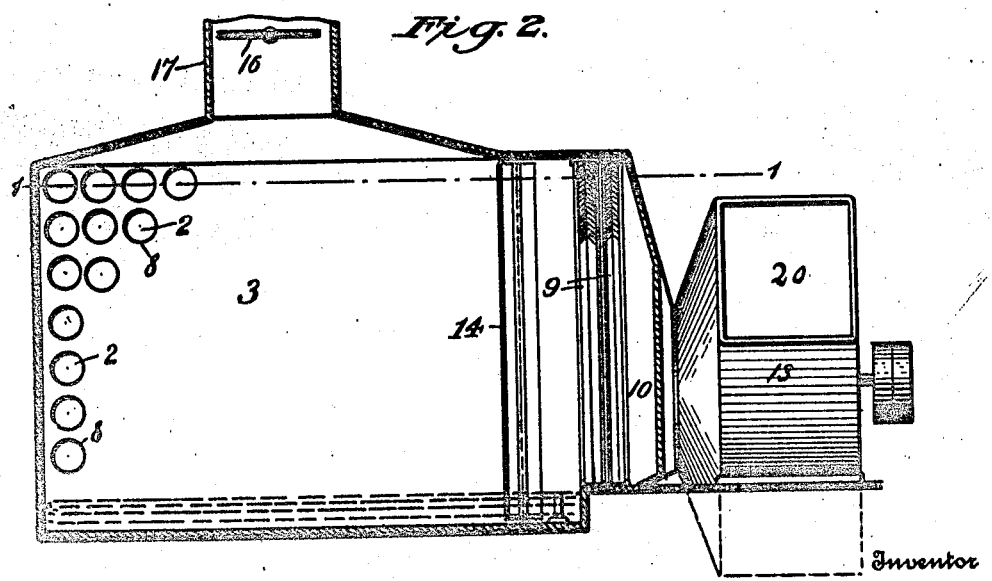

In the accompanying drawings, which form part of this specification:—Figure 1 represents a plan view partly in section on line 1—1 Fig. 2 of apparatus embodying my invention, the air heating chamber being omitted. Fig. 2 a sectional elevation of the same on line 2—2 Fig. 1. Fig. 3 represents a plan view partly in section on line 3—3 Fig. 4 of a modified form of the apparatus, and Fig. 4 a sectional elevation of the same on line 4—4 Fig. 3.

Reference being had to the drawings and the designating characters thereon, the numeral 1 indicates an outer casing, which may be made of sheet metal, brick or other preferred material and constitutes an air chamber, 2 spray or moistening chambers and 3 a cooling chamber.
4 is the air inlet to the spray chambers, see Fig. 3.

6 are heating coils for tempering the incoming air as may be desired.

7 are spray heads.
8 are tubes arranged within the cooling chamber and into which the spray heads are projected to saturate the air passing through the tubes, and constitute the separate spray or moistening chambers.

9 are baffle plates or condensing bodies for collecting the surplus moisture from the spray laden incoming atmosphere and are arranged in the path of the moisture laden or freighted air in transit toward the fan 13.

10 is the outlet for the spray charged air after it has passed through the spray chambers 2 in the tubes 8 in transit to the fan 13.

12 is a commingling chamber for the moistened air proceeding from the spray chambers 2 in the tubes 8 and from which it is discharged through the outlet 10.

14 are dampers separating the chamber 12 from the fan.

15 is a damper in the pipe 17 to control the admission of moistened air, and 16 is a damper in the outlet 17'.

In this type of apparatus only one fan is used. The cooling chamber 3 is made the reverse from that shown in the construction illustrated and described in the parent application, spray passing through the chambers 2 in the tubes instead of dry air. Furthermore, the tubes 8 are larger, into each of which is fitted a spray-head 7. The action of the spray-head is not only to moisten and cool the air passing through the tubes 8, but also to create a draft through each tube by the inductive effect of the spray. In the construction above referred to, the cooled and moistened air is either conducted into the fan and thence into the ducts for delivery into the building through outlet 20, or by the use of the dampers 14 and 16, is directed outside the building as may be desired, in the latter case, the outside damper 16 being preferably in an outlet 17' at the top of the chamber receiving the spray and the air currents from each of the spray tubes.

The type of apparatus shown in Figs. 1 and 2, is technically what is termed the "Draw-through" type, *i. e.* the fan draws the air through the heating and cooling chambers and around the heater coils, not shown in said Figs. 1 and 2.

Figs. 3 and 4 illustrate the application of this type of apparatus to what is termed the "Blow-through" type. The direction of the air in transit is indicated by arrows which make plain the operation. In the preferred construction, shown, however, the dry air is blown through and the moistened air is drawn through the apparatus whenever it is to be introduced in a mill or apartment.

In the construction shown in Figs. 3 and 4, saturated air from the tubes 8 passes into the chamber 12, from which it is drawn through passage 10 into the fan 13, is forced outward around said tubes 8 in chamber 3 and discharged through outlet 20 into the building.

Having thus fully described my invention, what I claim is—

1. In an air conditioning apparatus, an air chamber, tubes within said chamber, spray heads for moistening, cooling and inducing a current of air through said tubes, a fan, and means for varying the mixture of air proceeding from the air chamber and from the spray tubes.

2. In an air conditioning apparatus, an air chamber, tubes within said chamber, spray heads for moistening, cooling and inducing a current of air through said tubes, a fan, and means for separating the air proceeding from the air chamber and the moistened air from the tubes.

3. In an air conditioning apparatus, an air chamber, a plurality of spray chambers within said air chamber, a plurality of spray heads for moistening, cooling and inducing a current of air through said spray chambers, a fan, and means for separating the air proceeding from the air chamber and the moistened air from the spray chamber.

In testimony whereof I affix my signature, in presence of two witnesses.

STUART W. CRAMER.

Witnesses:
  JNO. B. HODGE,
  JNO. C. WATSON.